(No Model.)
J. H. CHOATE, Jr.
WATER WHEEL.
No. 471,951. Patented Mar. 29, 1892.
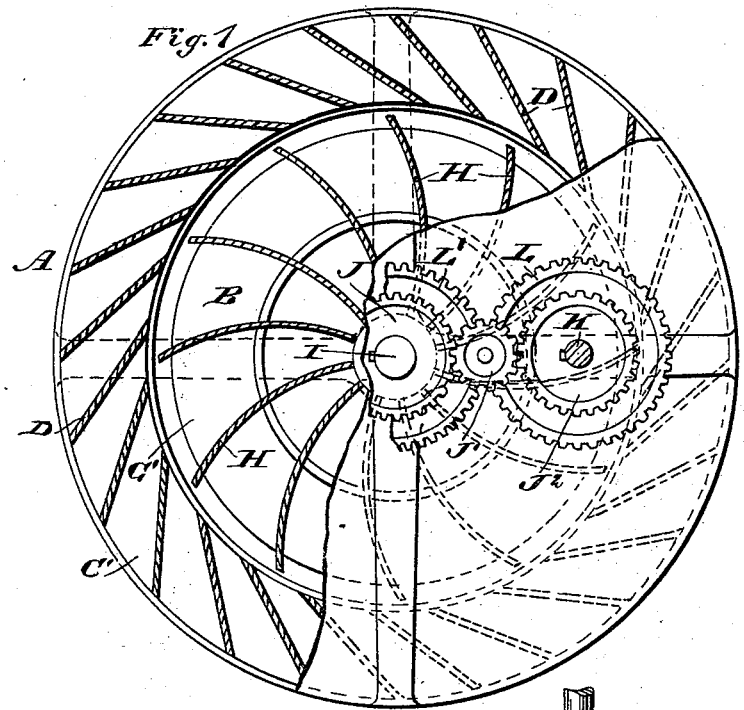
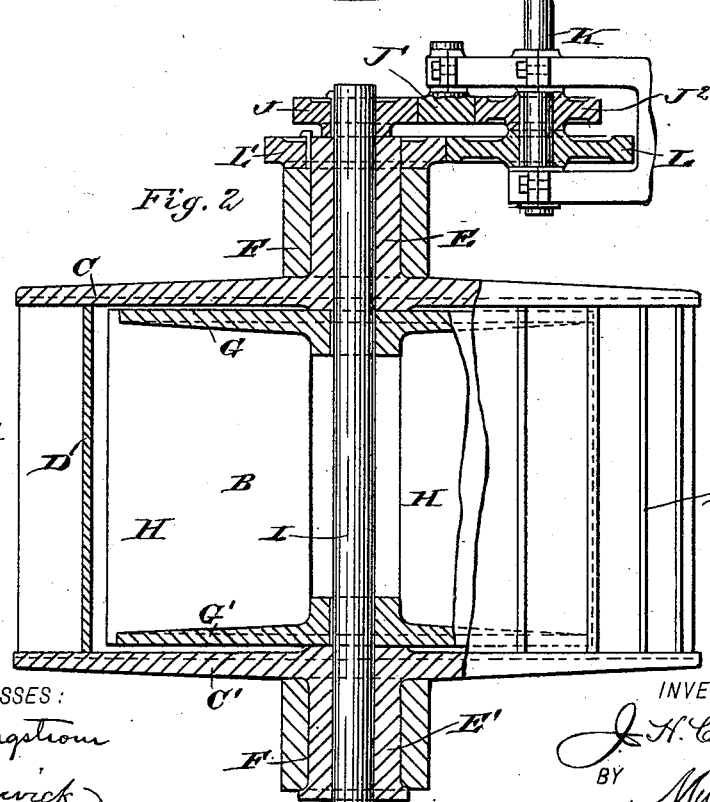
WITNESSES:
J. A. Bergstrom
C. Sedgwick
INVENTOR:
J. H. Choate Jr.
BY Munn & Co.
ATTORNEYS

UNITED STATES PATENT OFFICE.

JOSEPH HODGES CHOATE, JR., OF STOCKBRIDGE, MASSACHUSETTS.

WATER-WHEEL.

SPECIFICATION forming part of Letters Patent No. 471,951, dated March 29, 1892.

Application filed November 24, 1891. Serial No. 412,987. (No model.)

*To all whom it may concern:*

Be it known that I, JOSEPH HODGES CHOATE, Jr., of Stockbridge, in the county of Berkshire and State of Massachusetts, have invented a new and Improved Water-Wheel, of which the following is a full, clear, and exact description.

The object of the invention is to provide a new and improved water-wheel which is simple and durable in construction, very effective and powerful in operation, and arranged to utilize the head of water to the fullest advantage.

The invention consists in certain parts and details and combinations of the same, as will be fully described hereinafter, and then pointed out in the claim.

Reference is to be had to the accompanying drawings, forming a part of this specification, in which similar letters of reference indicate corresponding parts in both the figures.

Figure 1 is a plan view of the improvement with parts in section, and Fig. 2 is a sectional side elevation of the same.

The improved water-wheel is provided with an outer wheel A and an inner wheel B, contained within the outer wheel A. The outer wheel A is provided with top and bottom heads C and C', respectively, between which are arranged vanes D, standing at an angle and arranged tangentially to a circle of somewhat less diameter than the inner or second wheel B, so that the vanes discharge onto the inner wheel, thus forming a feed for the same.

On the heads C and C' of the outer wheel A are formed hollow trunnions E and E', respectively, mounted to turn in suitable fixed bearings F. The inner wheel B is also formed with the two top and bottom heads G and G', between which extend the curved plates H, forming buckets similar to the spokes of an ordinary undershot wheel. The inner wheel B has its heads G and G' secured on a shaft I, which passes through the hollow trunnions E and E', which latter form the bearings for the said shaft.

On the upper end of the shaft I is secured a gear-wheel J, in mesh with an intermediate gear-wheel J', meshing into a gear-wheel $J^2$, attached to the main driving-shaft K. On the latter is also secured a gear-wheel L, meshing into a gear-wheel L', secured on the trunnion E, so that when the two wheels are rotated in opposite directions a rotary motion in the same direction is imparted to the main driving-shaft K by the two wheels. The head of water is discharged onto the outer wheel A at one side, so that it passes through the wheel in the direction almost perpendicular to the axis and discharges and feeds the inner wheel B, so that the latter is rotated in an opposite direction to the direction of the outer wheel A. It will thus be seen that the water meets resistance on one side of the outer wheel and passes through it on the other side, thus of course turning the outer wheel, while at the same time the water that passes through on the other side turns the inner wheel in the other direction; also, all the water passing through the outer wheel is so deflected by the vanes D as to turn the inner one usefully. The opposite direction of rotation of the wheels is reconciled by the gearing above described, so that the shaft K turns in one direction, all the force of the two wheels A and B being transmitted to the said driving-wheel.

Having thus described my invention, I claim as new and desire to secure by Letters Patent—

A water-wheel comprising an inner wheel provided with curved plates forming buckets, an outer wheel containing the said inner wheel and provided with straight vanes discharging into the buckets of said inner wheel and standing tangential to a circle of less diameter than the inner wheel, a shaft carrying the inner wheel and mounted to turn in the hollow trunnions of the outer wheel, a gear-wheel held on the said shaft, an intermediate gear-wheel in mesh with the said shaft gear-wheel, and a main driving-shaft carrying two gear-wheels, of which one is in mesh with the said intermediate gear-wheel and the other with a gear-wheel on one of the trunnions of the outer wheel, substantially as shown and described.

JOSEPH HODGES CHOATE, JR.

Witnesses:
CHAS. E. EVANS,
CHAS. J. BRITTON.